United States Patent
Ai et al.

(10) Patent No.: US 6,217,279 B1
(45) Date of Patent: Apr. 17, 2001

(54) DEVICE FOR SEALING GAS TURBINE STATOR BLADES

(75) Inventors: Toshishige Ai; Masanori Yuri; Yasuoki Tomita; Kiyoshi Suenaga; Sunao Aoki; Hiroki Fukuno, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/230,820

(22) PCT Filed: Jun. 10, 1998

(86) PCT No.: PCT/JP98/02565

§ 371 Date: Feb. 10, 1999

§ 102(e) Date: Feb. 10, 1999

(87) PCT Pub. No.: WO98/58158

PCT Pub. Date: Dec. 23, 1998

(30) Foreign Application Priority Data

Jun. 19, 1997 (JP) .................................................. 9-162651
Jul. 1, 1997 (JP) .................................................. 9-275734
Jul. 8, 1997 (JP) .................................................. 9-182263

(51) Int. Cl.[7] .................................. F01D 5/18; F01D 9/06
(52) U.S. Cl. .......................... 415/110; 415/115; 415/116; 415/135; 415/136; 415/176; 415/180
(58) Field of Search ..................... 415/115, 116, 415/117, 110–113, 135, 136, 176, 178, 180

(56) References Cited

U.S. PATENT DOCUMENTS

| | | |
|---|---|---|
| 2,584,899 | 2/1952 | McLeod . |
| 2,651,496 * | 9/1953 | Buckland et al. .................. 415/180 |
| 2,919,891 * | 1/1960 | Oliver ................................ 415/180 |
| 3,275,294 * | 9/1966 | Allen et al. ....................... 415/115 |
| 3,647,311 * | 3/1972 | Wootton et al. .................. 415/113 |
| 3,892,497 * | 7/1975 | Gunderlock et al. ............. 415/178 |
| 3,945,758 * | 3/1976 | Lee .................................... 415/115 |
| 4,113,406 * | 9/1978 | Lee et al. .......................... 415/115 |
| 4,292,008 | 9/1981 | Grosjean et al. . |
| 4,930,980 * | 6/1990 | North et al. ...................... 415/115 |
| 5,407,237 | 4/1995 | Smolowitz . |
| 5,488,825 | 2/1996 | Davis et al. . |
| 5,609,466 | 3/1997 | North et al. . |
| 5,997,245 * | 12/1999 | Tomita et al. ................... 415/115 |
| 6,077,034 * | 6/2000 | Tomita et al. ................... 415/110 |
| 6,099,244 * | 8/2000 | Tomita et al. ................... 415/115 |

FOREIGN PATENT DOCUMENTS

| | | | |
|---|---|---|---|
| 938247 * | 10/1963 | (GB) | ............................ 415/115 |
| 42-3443 | 2/1967 | (JP) . | |
| 62-29701 | 2/1987 | (JP) . | |
| 64-8173 | 2/1989 | (JP) . | |
| 2-233801 | 9/1990 | (JP) . | |
| 5-52102 | 3/1993 | (JP) . | |
| 5-288002 | 11/1993 | (JP) . | |
| 6-257405 | 9/1994 | (JP) . | |
| 7-54669 | 2/1995 | (JP) . | |
| 9-60531 | 3/1997 | (JP) . | |

* cited by examiner

Primary Examiner—Christopher Verdier
(74) Attorney, Agent, or Firm—Wenderoth, Lind & Ponack, L.L.P

(57) ABSTRACT

A sealing device for a gas turbine stator blade, in which an outer shroud (32) is mounted by heat insulating rings (32a,32b) on a blade ring (50). The blade ring (50) has a first air hole (1), which communicates with a space (53), and a second air hole (51), which communicates with a seal tube (2). The seal tube (2) is inserted into the second air hole (51), and a spring (6) is arranged between a projection (4) of the tube (2) and a retaining portion (5) of the air hole (51) to removably secure the seal tube (2). Cooling air (54) flows through the first air hole (1) to cool the shrouds and the inside of a stator blade (31) until it is released from the trailing edge of the blade. The cooling air also flows into a cavity (36) so that a high pressure can be maintained without a pressure loss because the tube (2) is independent of the space (53) in the blade ring.

13 Claims, 12 Drawing Sheets

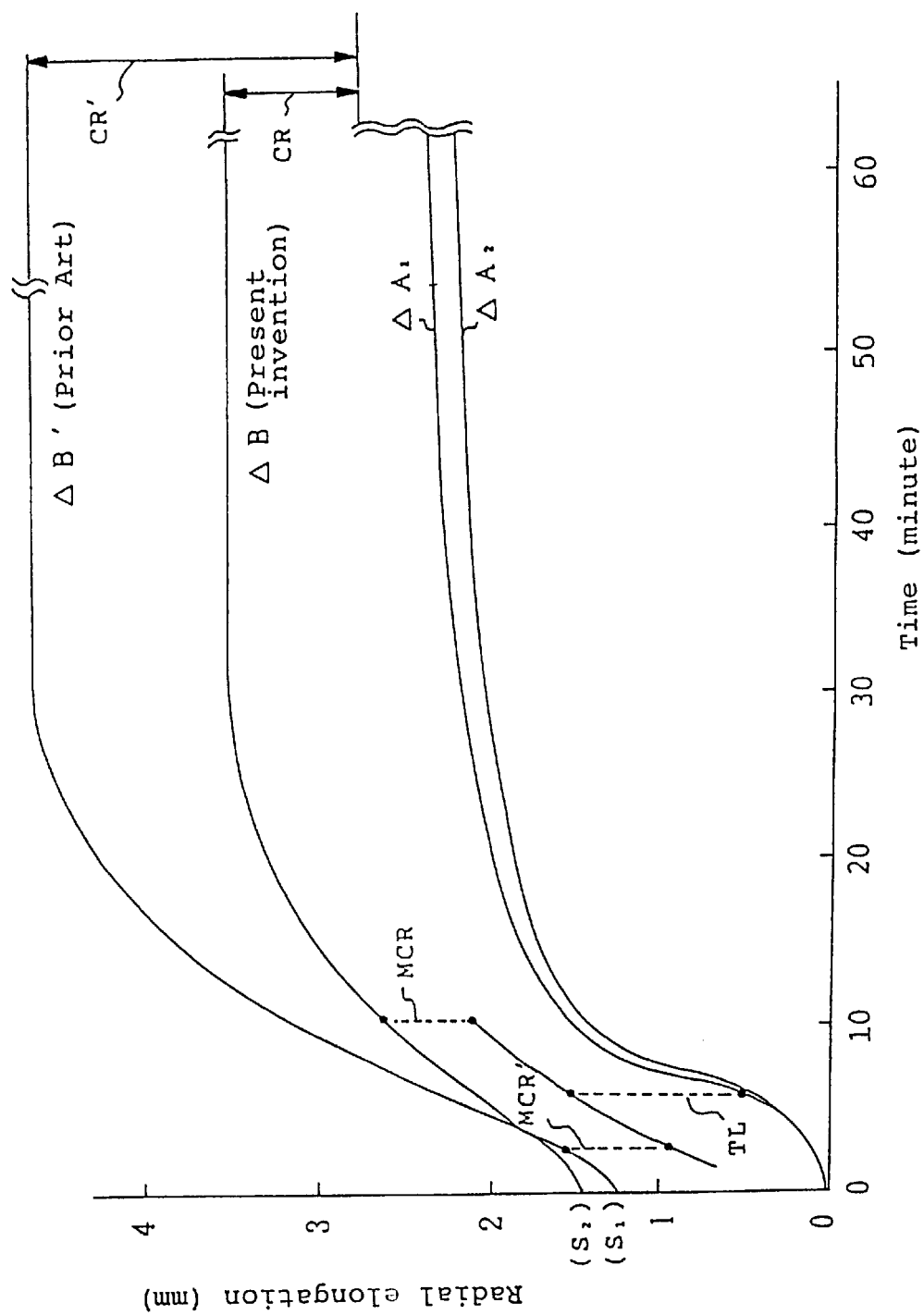

DEVICE FOR SEALING GAS TURBINE STATOR BLADES

BACKGROUND OF THE INVENTION

1. Technical Field

The present invention relates to a stator blade for a gas turbine, which is enabled by improving the feed of sealing air to reduce leakage of the air thereby to feed the air to an inner shroud efficiently and by cooling the sealing air to reduce the clearance between a rotor side and a stationary side at a rated running time.

2. Description of Related Art

FIG. 14 is a general block diagram of a gas turbine, which is constructed to include a compressor 150, a turbine 151 and a combustor 152. A fuel is burned in the combustor 152 with the air coming from the compressor 150 so that a hot combustion gas is fed to the turbine 151. This combustion gas flows through a combustion gas passage, in which moving blades mounted on a rotor and stator blades are alternately arranged in multiple stages, to rotate the rotor thereby to drive a power generator connected directly to the rotor. Since the turbine 151 is exposed to the hot combustion gas, the air from the compressor 150 is partially bled and fed to the turbine 151 to cool the stator blades, the moving blades and the rotor.

FIG. 15 is a sectional view showing a sealing air feed line to a representative stator blade of a prior art gas turbine, and shows the construction of the blades in the turbine 151 of FIG. 14.

In FIG. 15, reference numeral 21 designates a moving blade including a platform 22, a seal plate 23 under the platform 22, two end portions 24 and 25 of the platform 22, and a blade root 26. A plurality of moving blades 21 each composed of those members, are arranged in the circumferential direction of the rotor.

Reference numeral 31 designates a stator blade which is arranged adjacent to the moving blade 21. Numeral 32 designates an outer shroud, and numeral 33 designates an inner shroud. Numerals 34 and 35 designate two end portions of the inner shroud 33, and numeral 36 designates a cavity under the inner shroud 33. Numeral 37 designates a seal ring retaining, ring which has a labyrinth seal 37a at its end portion and which slides with respect to the rotating portion of the blade root 26 on the moving blade side. Numeral 38 designates an air hole that is formed through the seal ring retaining ring 37 to provide communication between the cavity 36 and a space at the blade root 26 of the adjoining moving blade 21. Numerals 40a and 40b designate seal portions between the platform 22 and the inner shroud 33. The seal portions adjoining each other and are constructed by fitting seal members between the end portions 24 and 34, and the end portions 25 and 35.

Numeral 50 designates a blade ring, on the inner side of which the outer shroud 32 of the stator blade 31 is fixed through heat insulating rings 32a and 32b. Numeral 51 designates an air hole, which is formed in the blade ring 50. The air hole 51 communicates with a space 53, which is formed by the blade ring 50, the heat insulating rings 32a and 32b and the outer shroud 32. The space 53 is connected at its leading end with an air source leading from the not-shown compressor. Numeral 52 designates a seal tube which extends from the outer shroud 32 in the stator blade 31 through the inner shroud 33.

In the construction thus far described, cooling air 54 from the compressor is fed from the air hole 51 of the blade ring 50 and into a space 53. This cooling air 54 flows on one side through the seal tube 52 into the cavity 36 under the inner shroud 33. The cooling air from this cavity is blown from the air hole 38, as indicated by arrow S1, into the trailing side space of the adjoining moving blade 21 at the upstream side and further through the labyrinth seal 37a into the leading side space of the moving blade 21 at the trailing stage, as indicated by arrow S2. These cooling air flows S1 and S2 emanate from the seal portions 40a and 40b, respectively, to prevent the combustion gas from entering the inside of the inner shroud 33.

As shown in FIG. 16, the air that has entered the space 53 cools the face of the outer shroud 32 and enters the cooling passage in the stator blade, so that it is blown out of the holes of the trailing edge while cooling the blade inside, until it is released into the combustion gas passage.

In the sealing structure thus far described, the air hole 51 of the blade ring has a diameter of 2 to 50 mm, and the seal tube 52 is limited in its internal diameter by the thickness and the camber of the blades. As a result, the in flow of air is subjected to a pressure loss so that its pressure drops. In addition, the cooling air having entered the space 53 leaks from clearances between the outer shroud 32 and the heat insulating rings 32a and 32b, as indicated by arrows S3 and S4.

One example of the pressure situations resulting from the aforementioned leakage will now be described. The cooling air 54 flowing into the air hole 51 of the blade ring 50 has a pressure of about 6 Kg /cm$^2$. This pressure is lowered to about 5 Kg/cm$^2$ in the space 53 by the pressure loss and further to 3.5 Kg/cm$^2$ in the cavity 36 due to the pressure loss. This pressure level is equal to the pressure of 3.5 Kg/cm$^2$ between between the moving blade 21 and the stator blade 31 adjoining each other so that the sealing effect is deteriorated.

A first problem of the sealing structure for the prior art gas turbine stator blade thus far described, is that the cooling air fed from the air hole 51 of the blade ring 50 leaks from the clearances between the outer shroud 32 and the heat insulating rings 32a and 32b, even though it flows into the space 53 between the blade ring 50 and the outer shroud 32 and into the cavity 36 under the inner shroud 33 from the seal tube 52. On the other hand, the cooling air is subjected to a pressure loss in the seal tube 52 so that its pressure drops when it flows into the cavity 36 of the inner shroud. As a result, the difference in the pressure of the combustion gas disappears to make it difficult for the cooling air to maintain sufficient pressure as the sealing air.

FIG. 16 is a sectional view showing a stator blade of the prior art gas turbine and explains the cooling of the stator blade mainly although the stator blade has the same structure as that of FIG. 15. In the stator blade 31, as shown in FIG. 16, air passages 80A, 80B and 80C are sequentially formed to form a serpentine passage. Reference numeral 80D designates the trailing edge of the blade, which has a number of film cooling air holes 60. The seal tube 52 vertically extends through the stator blade 31. The seal tube 52 opens at its lower end into cavity 36. The seal ring retaining ring 37 retains the flange of the inner shroud 33 and the labyrinth seal 37a. The air hole 38 is formed in the retaining ring 37 to provide communication between the cavity 36 and a space 72 between the adjoining moving blade. The outer shroud 32 has a cooling air feeding hole 62. Note the numeral 21 designates the adjoining moving blade 21.

In the stator blade thus constructed, cooling air 70 is fed from the hole 62 of the outer shroud 32 to the air passage 80A on the leading edge side of the stator blade 31, and the air then flows at the inner side into the next air passage 80B and then at the outer side into the adjoining air passage 80C. The cooling air 70 then flows at the inner side to cool the stator blade 31 sequentially and eventually flows from the air holes 60 of the trailing edge 80D along the outer surfaces of the trailing edge to provide a film cooling effect.

From the open end of the seal tube 52 of the outer shroud 32, cooling air 71 for the cooling operation flows from the lower end of the seal tube 52 into the cavity 36, as shown in FIG. 16, and this portion of the air flows from the air hole 38 formed in the cavity 36 into the space 72 between the former and the adjoining moving blade and further through the labyrinth seal 37a into a forward space 73. Thus, the cooling air flows from the seal tube 52 into the cavity 36 to keep the inside of the cavity 36 at a higher pressure level than that in the outside combustion gas passage to thereby prevent the hot combustion gas from entering the interior of spaces 72, 73. Although not shown, the air from the compressor passes the disc cavity and flows from the radial hole formed in the blade root 26 to the inside of the platform 22 and is guided to cool the moving blade 21.

The prior art gas turbine stator blade is provided with the air passage for cooling, as has been described hereinbefore. This air passage is ordinarily formed as a serpentine passage, and the cooling air is fed from the outer shroud into the air passage to cool the inside of the stator blade until it is released from the trailing edge. Separately of the cooling purpose, the seal tube extends through the stator blade to feed a portion of the cooling air as the sealing air from the outer shroud into the cavity of the inner shroud, which is kept at a higher pressure than that in the external combustion gas passage to prevent the hot combustion gas from entering the cavity of the inner shroud.

In the stator blade cooling system thus far described, the cooling air is fed for the cooling purpose and for the sealing purpose. The cooling air cools the stator blade and is then released from the trailing edge to the combustion gas passage. On the other hand, a portion of the cooling air is bled as sealing air and is fed through the seal tube to the cavity so that it is released from the cavity into the spaces between the former and the adjoining front and rear moving blades. In addition to the pressure loss of the foregoing first embodiment, therefore, a second problem of the sealing device for the gas turbine stator blade arises from the fact that large amounts of air are consumed for the cooling and sealing purposes so that the capacity of the compressor must be increased thereby adversely affecting the performance of the gas turbine.

FIG. 17 is a section showing a general blade cascade of the gas turbine and the entire cascade of the stator blades shown in FIG. 15 or 16. Reference numerals 81C, 82C, 83C and 84C in FIG. 17 designate the stator blades, which are individually arranged in a plurality of radial rows around the rotor and on the stationary side. Numerals 81S, 82S, 83S and 84S designate the moving blades which are mounted around the rotor through their respective roots and which are axially arranged alternately of the rows of stator blades so that they may rotate together with the rotor. Numerals 111C, 112C, 113C and 114C designate the individual inner shrouds of the stator blades 81C to 84C, respectively, and numerals 111S, 112S, 113S and 114S designate the individual platforms of the moving blades 81S to 84S.

Numerals 37-1, 37-2 and 37-3 designate the seal ring retaining rings, which are respectively fixed on the flanges of the inner shrouds 111C to 114C of the stator blades 81C to 84C and are arranged in an annular shape around the rotor. These seal ring retaining rings 37-1 to 37-3 retain on their interiors the labyrinth seals (or seal rings) adjacent to the rotor. Thus, in the example shown in FIG. 17, the gas turbine is constructed of the stator blades and the moving blades of four stages. With this construction, the rotor is rotated by the combustion gas to drive a generator.

In the gas turbine, as described with reference to FIGS. 15 and 16, the stator blades, the moving blades and the rotor are exposed to the hot gas which is 800 to 1,000° C. at the entrance or up to 1,500° C., as developed in recent years, so that these components are cooled by the cooling air by bleeding the air from the compressor. A constant clearance is necessary between the rotor side and the stationary side of the members. In FIG. 17, a clearance CR' is maintained between the lower end of the labyrinth seal 37a, supported by the seal ring retaining ring 37, and the opposing face on the rotor side. Between the individual turbine stages, the clearance CR' is a minimum from the start to the rated rotating speed by the time difference of the thermal elongation between the rotor side and the stationary side and increases from the minimum when the rated rotating speed is reached as the clearance is heated by the combustion gas. The clearance CR' is preferably small for the higher sealing performance. Since the clearance is at a minimum after the start by the aforementioned characteristics, however, the design value cannot be made so small while estimating not only that minimum but also the vibration during the run and manufacture error. Therefore, a third problem is that a large clearance will cause the sealing performance to deteriorate when the rotation reaches the rated value. Thus, there is a need to optimize the clearance in order to improve the drop of sealing pressure due to the pressure loss associated with the aforementioned first problem and the consumption of the high flow rate of the air in the second embodiment and to reduce the clearance during the run.

SUMMARY OF THE INVENTION

In order to solve the first problem, therefore, it is an object of the present invention to provide a sealing device for a gas turbine stator blade, which will enhance the sealing effect by devising the feed line for the sealing air to be fed from the blade ring into the stator blade, thereby to reduce the air flow leaking from the outer shroud and to feed the sealing air under a sufficient pressure to the inner shroud.

Another object of the present invention is to provide a sealing device for a gas turbine stator blade, which has the enhanced 20 sealing effect and which can be easily assembled and disassembled for maintenance by adopting a removable structure for the sealing air feeding seal tube and can achieve the sealing effect with a simple structure.

In order to solve the second problem, it is yet still another object of the invention to reduce the cooling air flow and to contribute to an improvement in the performance of a gas turbine by improving the system for feeding the cooling air and the sealing air for the stator blade of the gas turbine.

In order to solve the third problem, moreover, a further object of the invention is to improve the sealing performance by cooling the seal ring retaining ring with the sealing air in such a manner that the clearance between the rotor side and the stationary side smaller than that of the prior art arrangement, even if the clearance is thermally elongated during the run between the individual stages of the gas turbine, thereby to improve the sealing performance.

In order to achieve these individual objects, according to the invention, there are provided the following means (1) to (4).

(1) A sealing device for a gas turbine stator blade, in which air is guided from an air hole formed in a blade ring through a space formed by the blade ring, a heat insulating ring and an outer shroud. The air is further guided from the space through a seal tube in the stator blade into an inner shroud, so that the pressure in a cavity of the inner shroud may be held at a higher pressure than that in a combustion gas passage to seal the inside of the inner shroud. The air hole includes an air hole in communication with the seal tube and an air hole communicating with the space.

(2) A sealing device for a gas turbine stator blade as set forth in item (1), characterized in that the seal tube is removably connected to the blade ring air hole communicating with the seal tube.

(3) A sealing device for a gas turbine stator blade characterized in that an air passage is formed in a blade and fed with cooling air from an outer shroud to cool the blade, so that the cooling air is then fed as sealing air from the air passage via an air hole formed in an inner shroud to an inner cavity.

(4) A sealing device for a gas turbine stator blade, in which a portion of the air is bled from a compressor and guided via a space formed by an outer shroud into a stator blade and further through the stator blade into a cavity formed by an inner shroud and a seal ring retaining ring, to make the pressure in the inner shroud higher than that in a combustion gas passage thereby to seal the inside of the inner shroud. The air bled from the compressor is cooled by a cooler and is then guided into the stator blade to cool the seal ring retaining ring with the air cooled by the cooler.

In the means described in item (1) of the invention, the space, which is formed by the blade ring, the heat insulating ring and the outer shroud, is fed with the air from the air hole communicating with the space, and this air is guided to the cooling passage in the stator blade while cooling the face of the outer shroud and is released from the holes of the blade trailing edge while cooling interior of the blade.

On the other hand, the seal tube is fed with the air from the air hole communicating therewith and is independent of the space so that the air can be fed to the inner shroud without being influenced by the air flow leaking from the space through the clearance between the outer shroud and the heat insulating ring joint and without experiencing significant pressure loss. As a result, the cavity in the inner shroud can be maintained at a higher pressure than that of the combustion gas passage to enhance the sealing effect.

In the means described in item (2) of the invention, the leading end of the seal tube is removably connected to the air hole so that it can be easily inserted and fixed in and removed from the stator blade during assembly or maintenance of the stator blade.

In the means described in item (3) of the invention, the air, having passed the air passage in the stator blade and cooled the blade, is utilized as the sealing air for the stator blade so that the seal tube can be dispensed with unlike the prior art arrangement. In the prior art arrangement, a portion of the cooling air is guided as the sealing air from the outer shroud and directly into the cavity through the seal tube and is uselessly released after having cooled the blade from the trailing edge to the combustion gas passage. In the means described in item (3) of the invention, cooling air passes through the air passage in the stator blade to cool the blade and then flows from the air hole of the inner shroud into the cavity so that the pressure in the cavity is maintained at a higher level than that of the outside to prevent the hot gas from entering the interior cavity. As a result, the seal tube can be dispensed with to reduce costs, and the cooling air is effectively used so as to reduce the necessary flow rate thereby improving the performance of the gas turbine.

In the means described in item (4) of the invention, in addition to the improvement in the sealing effect by the constructions of the aforementioned means in items (1) and (2), the clearance between the stationary side and the rotor side is reduced at the rated running time. Specifically, the seal ring retaining ring of the gas turbine is mounted on a flange of the inner shroud of the stator blade and is made annular to retain the seal ring on its inner side. Thus, rotor rotates while maintaining a predetermined clearance between the seal ring or the stationary side and the rotor side so that the sealing effect is improved by the smaller clearance. However, when the rated run is reached, the clearance grows larger than the initial set value due to thermal elongation so that the sealing performance is reduced. Specifically, the clearance is determined by the difference of the thermally elongated size between the stator side and the rotor side, and the thermally elongating characteristics are different between the stationary side and the rotor side so that the thermal elongation is larger on the stationary side than on the rotor side. During the running time at the rated rotating speed, the difference exceeds the initial clearance.

In the means described in item (4) of the invention therefore, the sealing air is used to cool the seal ring retaining ring. At the seal ring retaining ring, i.e., on the stationary side, therefore, the temperature difference between the starting (or cold) time and the running (or hot) time is smaller than in the prior art arrangements, in which the seal ring retaining ring is not cooled. As a result, the thermal elongation on the stationary side at the rated running time is smaller in the prior art arrangements, and the clearance when the rated rotating speed is reached, that is, the difference of the thermal elongation between the stationary side and the rotor side is also smaller than in the prior art arrangements, so that the sealing air is accordingly reduced to improve the sealing performance.

In the present invention, moreover, the seal ring retaining ring is cooled so that the thermal elongation at the seal ring retaining ring, i.e., on the stationary side is reduced from the start with respect to the prior art arrangements. As a result, the initially clearance can be set at a larger value than that of the prior art with the resultant advantages in design and manufacture.

BRIEF DESCRIPTION OF THE DRAWINGS

FIG. 11 is a graph showing comparisons with the prior art in thermal elongations on a rotor side and a stator side by cooling a gas turbine seal ring retaining ring according to the first and second embodiments of the invention;

DETAILED DESCRIPTION OF THE INVENTION

Figure 1:
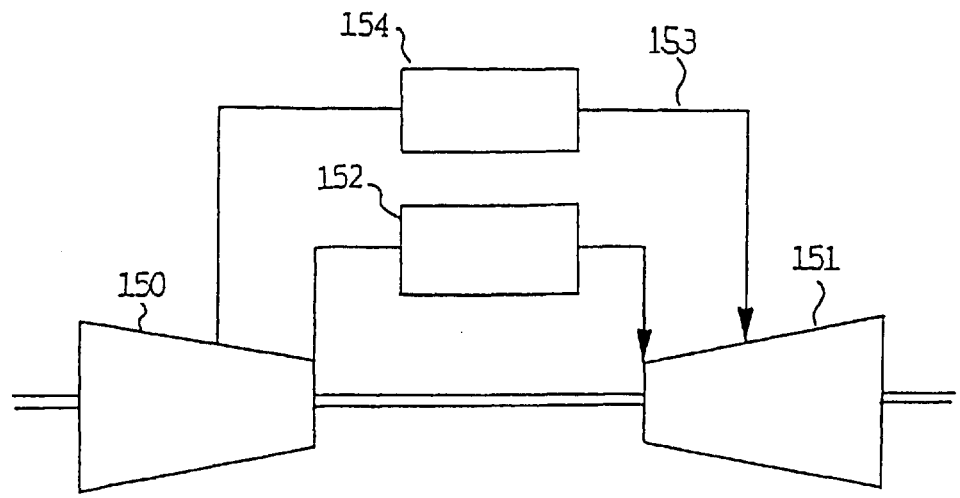
FIG. 1 is a diagram showing the entire construction of a gas turbine plant in which a gas turbine stator blade of the invention is applied.
Figure 10:
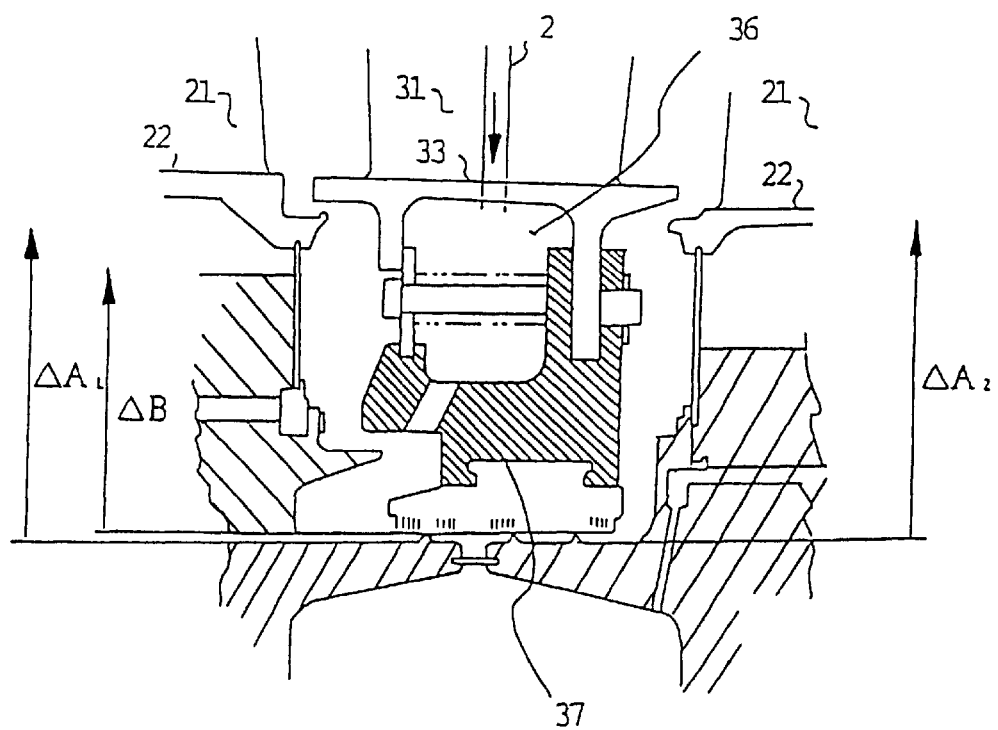
FIG. 10 is a section showing the neighborhood of a seal ring retaining ring of the gas turbine stator blade according to the first and second embodiments of the invention.
Figure 2:
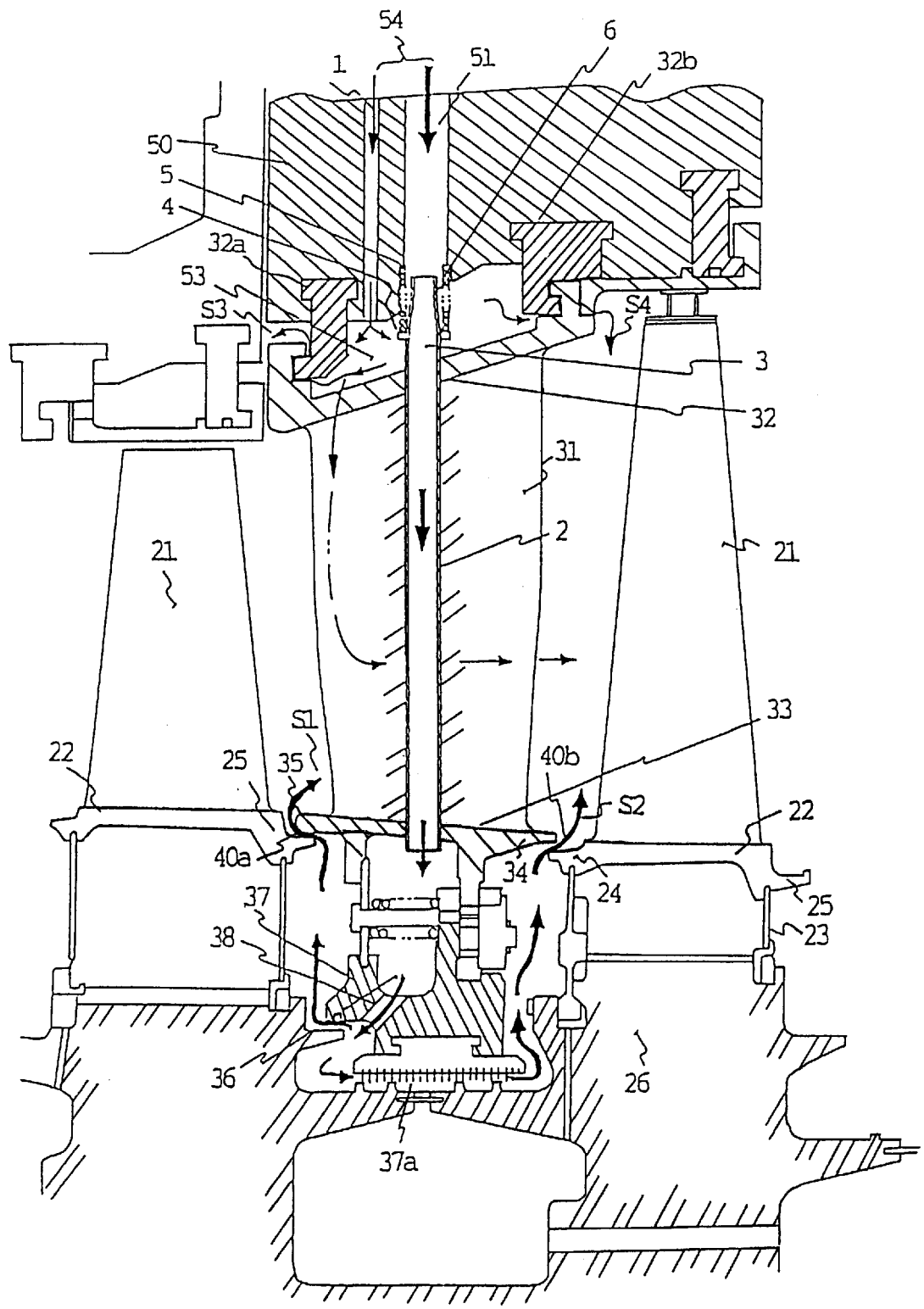
FIG. 2 is a sectional view showing the entirety of a sealing device for a gas turbine stator blade according to a first embodiment of the invention.
Figure 14:
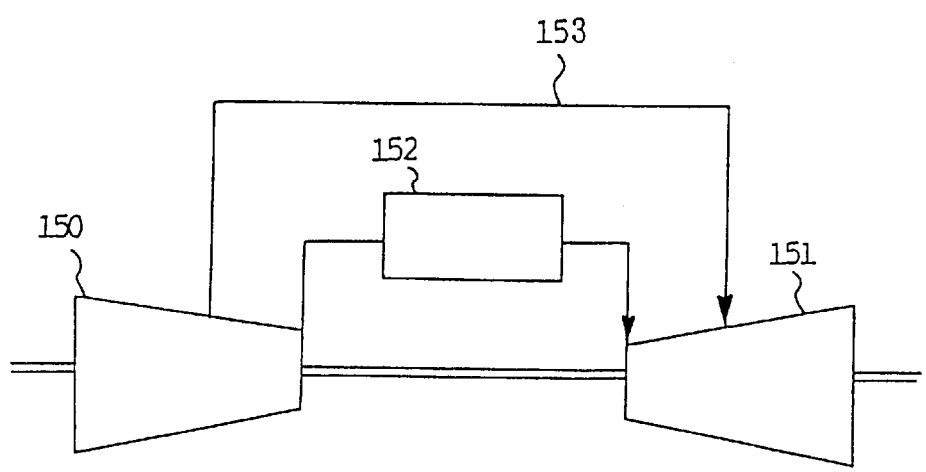
FIG. 14 is a diagram showing the general construction of a prior art gas turbine.

The present invention will be described in detail with reference to the accompanying drawings. FIG. 1 is a diagram showing a construction of the entirety of a gas turbine. As shown, the gas turbine is constructed to include a compressor 150, a turbine 151 and a combustor 152. In the combustor 152, the fuel is burned with the air coming from the compressor so that hot combustion gas is generated and fed to the turbine 151. In the construction, in which the air from the compressor 150 is bled via a bleeder line 153 and fed through the turbine 151 into a rotor, moving blades and stator blades until it cools down, is identical to that of the prior art device, as shown in FIG. 14. In the embodiments of the invention, a cooler 154 is disposed, if necessary, midway in the bleeder line 153 so that it can cool the cooling air coming from the compressor 150. This cooler 154 is used, if necessary, for cooling especially a seal ring retaining ring, as shown in FIGS. 10 and 11 of the present invention. FIG. 2 is a sectional view showing a sealing device for a stator blade in the turbine 151 of the gas turbine, as described hereinbefore, and shows a first embodiment of the invention.

Figure 15:
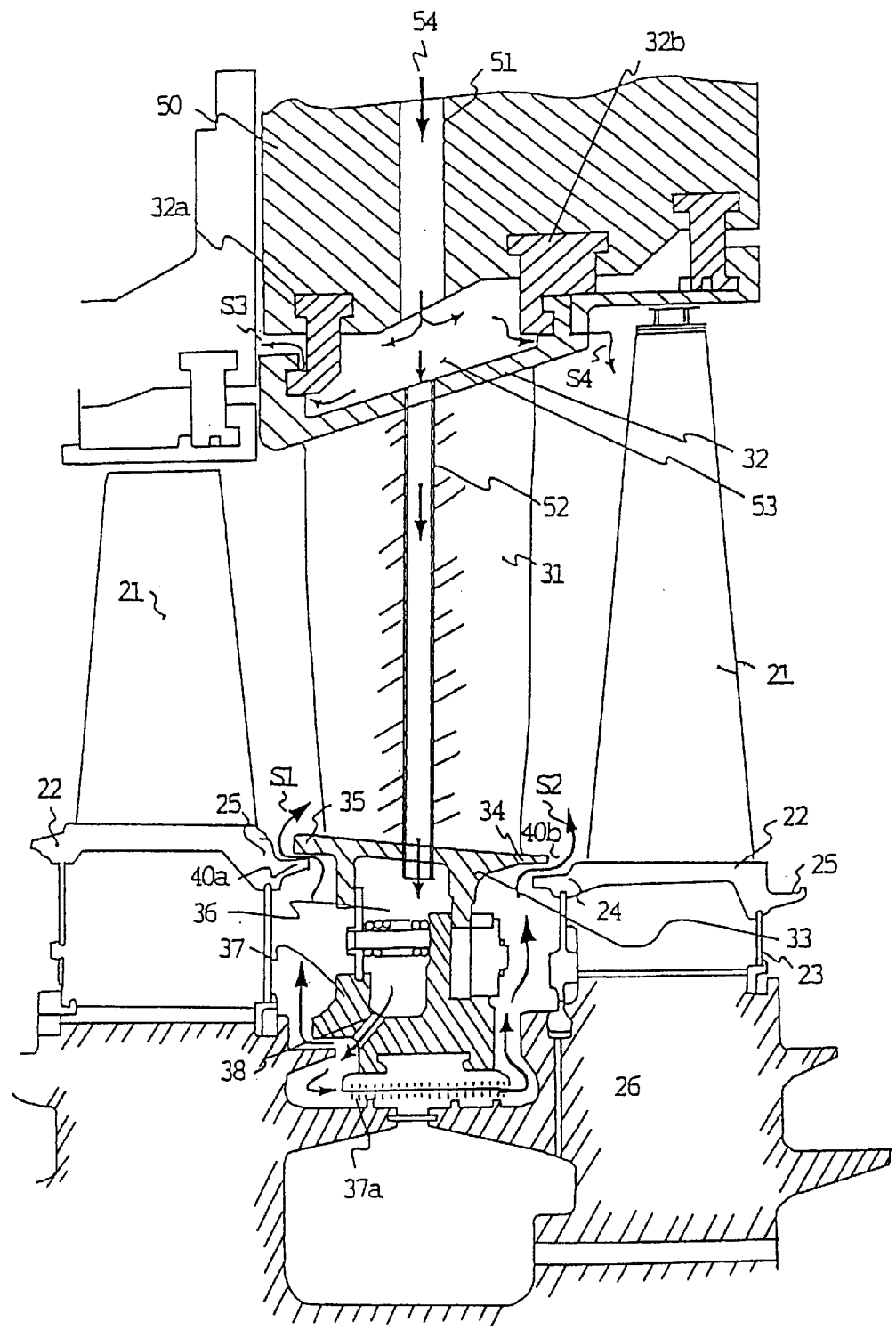
FIG. 15 is a sectional view showing a sealing structure of the prior art gas turbine stator blade.

In FIG. 2, the structure of the moving blade, as designated by the reference numerals 21 to 26, the structure of the stator blade, as designated by the numerals 31 to 38, and the entire structure of the stator blade and the moving blade, as designated by the numerals 40, 50, 51 and 53, provide the same functions as those of the prior art device shown in FIG. 15. Therefore, the descriptions thereof are omitted. The portions featuring the invention are identified by the reference numerals 1 to 6, as will be described in detail.

Reference numeral 1 appearing in FIG. 2 designates an air hole which is formed separately of the air hole 51 in the blade ring 50 so as to communicate with the space 53.

Numeral 2 designates a seal tube, which extends from an outer shroud 32 through the inside of a stator blade 31 and further through an inner shroud 33 and is inserted into a cavity 36. A seal tube leading end portion 3 extends into the space 53 and is inserted into the air hole 51.

Numeral 4 designates a projection fixed around the leading end portion 3 of the seal tube 2, and numeral 5 designates a retaining portion formed in the blade ring 50 on the exit side of the air hole 51 and having an enlarged radius. Numeral 6 designates a coil spring which is arranged around the seal tube leading end portion 3. One end of the coil spring goes into the air hole 51 and is retained on the step of the retaining portion 5, and the other end of the coil spring is held by the projection 4 to push the projection with an elastic force thereby to fix the seal tube leading end portion 3.

Figure 3:
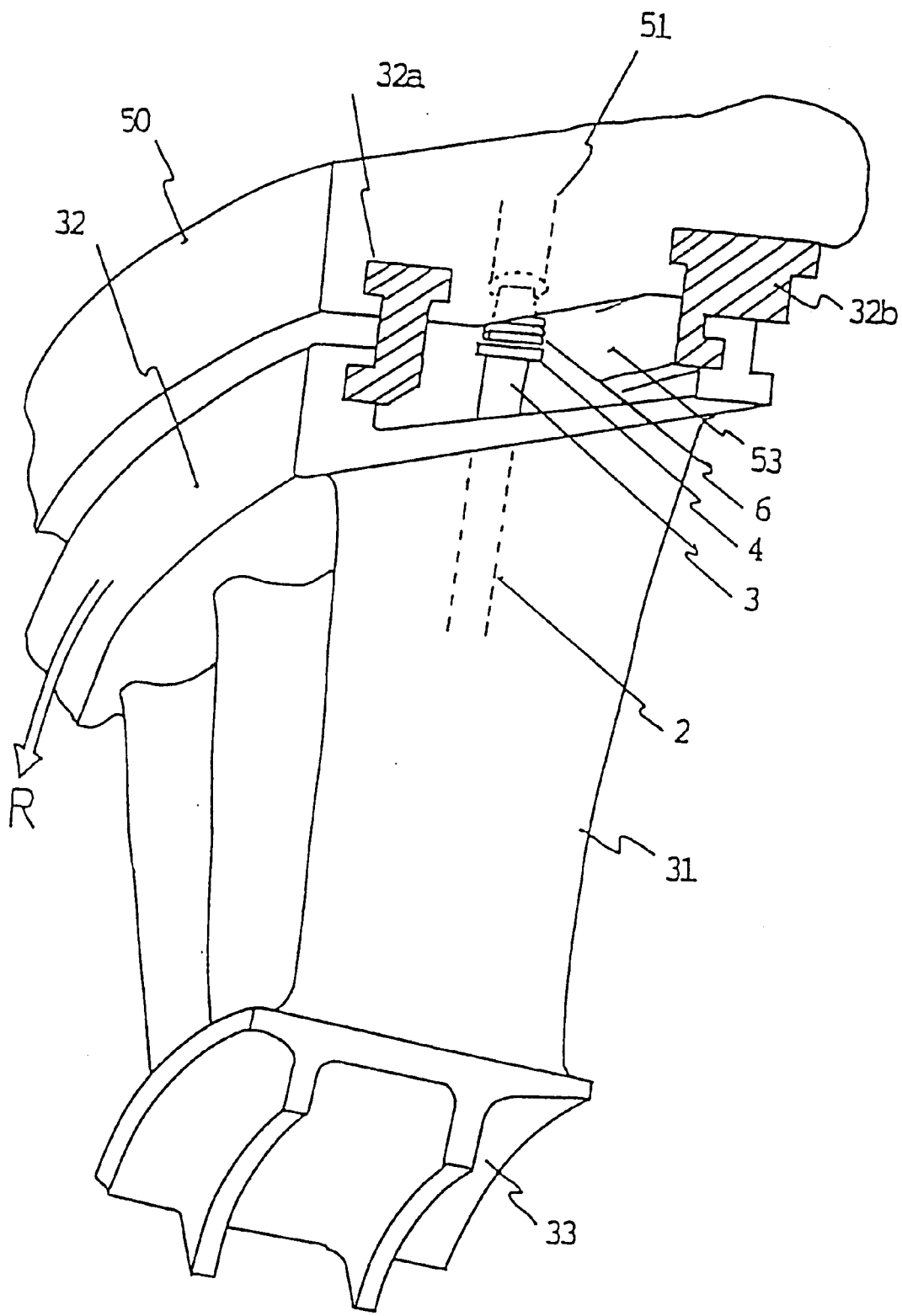
FIG. 3 is a perspective view showing an assembled state of the sealing device for a gas turbine stator blade according to the first embodiment of the invention.

FIG. 3 is a perspective view showing the assembled state of the stator blade. When the stator blade 31 is assembled, as shown, in order to insert the seal tube 2 into the air hole 51 of the blade ring 50, the outer shroud 32 bearing the seal tube 2 and the spring 6 is covered with the blade ring 50 while inserting the seal tube 2 into the air hole 51. Next, heat insulating rings 32a and 32b are provided one by one in a circumferential direction (or in a direction R) to attach the outer shroud 32. The detachment is performed in the revers order. In this assembly, the spring 6 is elongated by its elastic force between the projection 4 of the seal tube leading portion 3 and the enlarged retaining portion 5 of the air hole 51 so that the seal tube 2 can be fixed in the blade ring 50.

Figure 4:
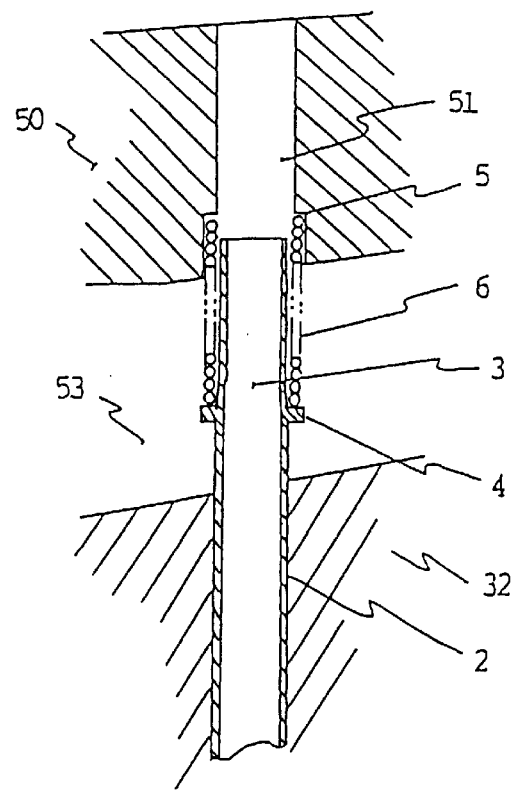
FIG. 4 is a sectional view showing a seal tube leading end portion of the sealing device for a gas turbine stator blade according to the first embodiment of the invention.

FIG. 4 is a sectional view showing the state in which the seal tube leading end portion 3 is mounted in the air hole 51. As shown, the seal tube leading end portion 3 is slightly fitted in the air hole 51 and is surrounded by the spring 6. The spring 6 is disposed between the projection 4 formed on the seal tube 2 and the radially enlarged retaining portion 5 in the air hole 51 of the blade ring 50 so that the elastic force of the spring fixes the seal tube 2 in the air hole of the blade ring 50.

Figure 5:
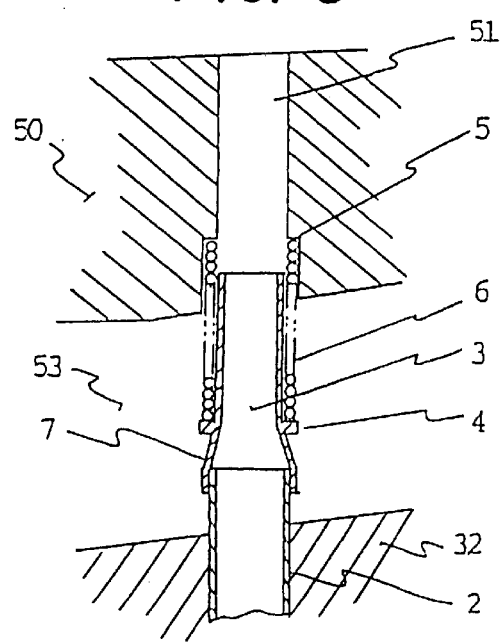
FIG. 5 is a sectional view showing another example of the seal tube leading end portion of the sealing device for a gas turbine stator blade according to the first embodiment of the invention.

FIG. 5 is a sectional view showing another example of the first embodiment of the state in which the seal tube leading end portion is fitted in the air hole. On the leading end of the seal tube 2, there is fitted a removable adapter 7, the leading end of which is inserted into the air hole 51 of the blade ring 50. The adapter 7 is provided with a projection 4, and the spring 6 is disposed between the projection and the enlarged retaining portion 5 formed in the air hole 51, to fix the seal tube due to its elastic force. Thus, in the example shown in FIG. 5, the seal tube 2 is fixed via the adapter 7.

In the sealing device for the gas turbine stator blade thus far described according to the first embodiment, a portion of the cooling air, as bled from the compressor, flows from the air hole 1 into the space 53, which is formed by the blade ring 50, the outer shroud 32 and the heat insulating rings 32a and 32b. The air flowing into the space 53 cools the face of the outer shroud 32 as in the prior art, then go into the cooling passage inside the stator blade 31 that is not shown, and blows out from the trailing edge while cooling the blade interior inside, as has been described in connection with the example of the prior art device of FIG. 16, until it is released into the combustion gas passage.

A portion of the air having entered the space 53 leaks, as indicated by arrows S3 and S4, from the clearances between the outer shroud 32 and the heat insulating rings 32a and 32b into the combustion gas passage, but exerts no influence on the pressure of the sealing air because it is independent of the lines of the sealing air hole 51 and the seal tube 2.

The cooling air 54 flows from the air hole 51 into the seal tube 2 and goes into the cavity 36 in the lower portion. The cooling air further flows from the cavity 36 via an air hole 38, which is formed in a seal ring retaining ring 37, into the space between the adjoining moving blade 21 and stator blade 31, until it flows out to the combustion gas passage through a seal portion 40a as indicated by arrow S1.

On the other hand, the air in the cavity 36 flows via the air hole 38 and through a labyrinth seal 37a into the space between the labyrinth seal 37a and the adjoining downstream moving blade 21 until it flows through a seal portion 40b, as indicated by arrow S2, into the combustion gas passage. Thus, the hot combustion gas is prevented, by the outflow of the sealing air from the seal portions 40a and 40b, from entering the inside of the stator blade from the combustion gas passage.

Next, a first example of the pressure state in the air passages thus far described will be described. The cooling air 54 is at about 6 Kg/cm$^2$. When the cooling air 54 flows into the air holes 1 and 51, it is subjected in the space 53 to a pressure loss by the inflow from the air hole 1 so that it takes about 5 Kg/cm$^2$ as in the prior art. However, the air flowing through the air hole 51 is independent of the space 53 so that it flows without any substantial pressure loss through the seal tube 2 into the cavity 36 to maintain the pressure in the cavity 36 at about 5 Kg/cm$^2$.

In the prior art, the pressure in the cavity 36 is lowered to about 3.5 Kg/cm$^2$ because the air flowing through a seal tube 52 receives the pressure loss. In the first embodiment of the invention, however, the pressure in the cavity can be kept as high as 5 Kg/cm$^2$. Due to this high pressure in the cavity 36, the air is expelled, as indicated by the arrows S1 and S2, from the seal portions 40a and 40b into the combustion gas passage, which is at about 3.5 Kg/cm$^2$ so that the sealing pressure is high enough to provide a sufficient sealing effect.

For the assembly or disassembly of the stator blade, the leading end of the seal tube 2 can be easily fixed in the air hole 51 of the blade ring 50 by compressing the spring 6, by inserting the seal tube leading end slightly into the air hole 51 and by permitting the spring 6 to elongate. If the structure shown in FIG. 5 is adopted, the attachment and detachment are facilitated by handling the adapter 7 and the spring 6. According to this fixing method using the spring 6, moreover, the thermal elongation, if any, of the seal tube 2 can be accommodated by the air hole 51 against the elastic force of the spring 6 so that it can be absorbed.

FIGS. 6 to 9 show a sealing device for a gas turbine stator blade constructed in accordance with a second embodiment of the invention, which is different from the first embodiment in that a bellows 9 is used to provide a seal between the ring 50 and the seal tube leading end portion 3. The remaining construction is identical to that of the first embodiment, and thus its description will be omitted.

Figure 6:
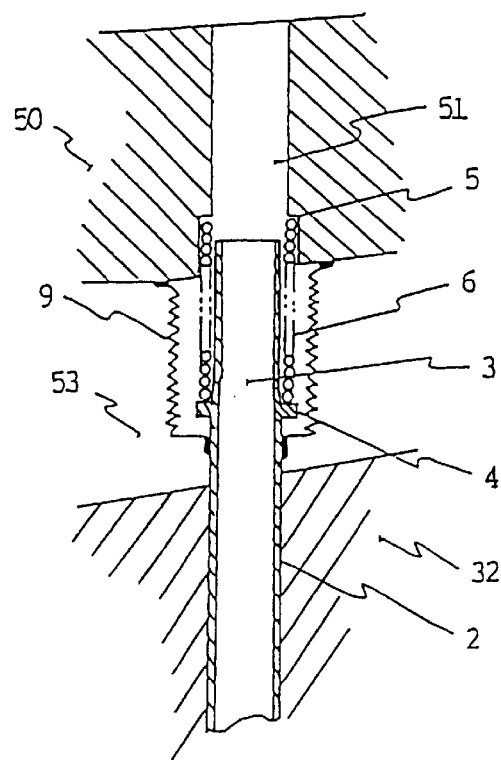
FIG. 6 is a sectional view showing a seal tube leading end portion of a sealing device for a gas turbine stator blade according to a second embodiment of the invention.
Figure 7:
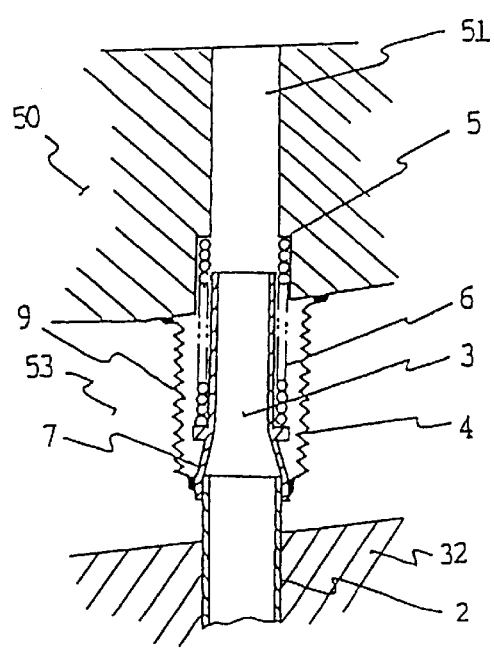
FIG. 7 is a sectional view showing another example of the seal tube leading end portion of the sealing device for a gas turbine stator blade according to the second embodiment of the invention.
Figure 8:
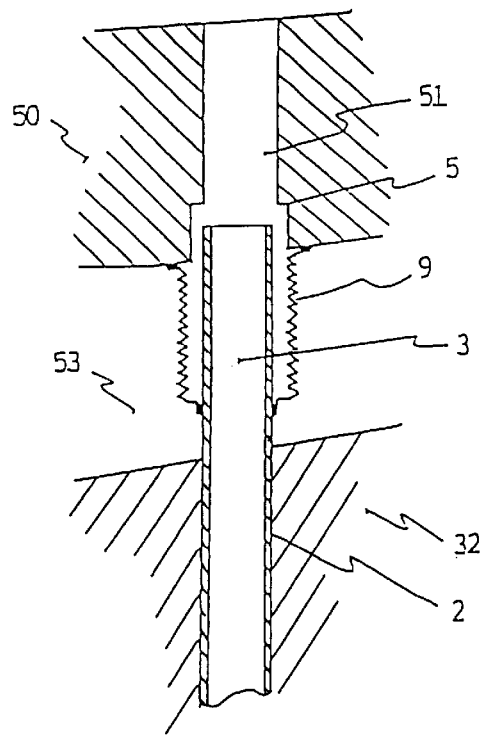
FIG. 8 is a sectional view showing a modified example of the sealing device for a gas turbine stator blade according to the second embodiment of the invention as shown in FIG. 6.
Figure 9:
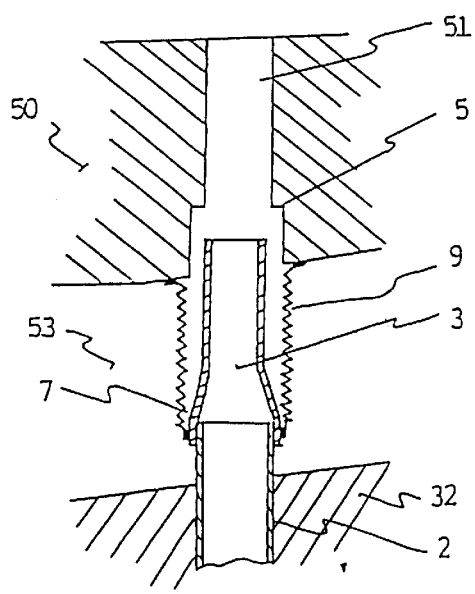
FIG. 9 is a sectional view showing a modified example of the sealing device for a gas turbine stator blade according to the second embodiment of the invention as shown in FIG. 7.

In FIG. 6, the bellows 9 is provided to seal the seal tube leading end portion 3 with respect to the blade ring 50. The bellows 9 is fixed at its upper end around the air hole 51 of the blade ring 50 by a soldering method or the like, and at its lower end around the seal tube 2 likewise by the soldering method or the like. In FIG. 7, the bellows 9 is fixed at its lower end around the adapter 7. The remaining construction is identical to that of FIG. 6. In FIG. 8, the spring 6 and the projection 4 are eliminated from the construction of FIG. 6, such that only the bellows 9 is provided so that its elongation and contraction may provide the action of the spring force. In FIG. 9, the spring force is likewise provided in the construction of FIG. 7 exclusively by the bellows 9.

In the second embodiment shown in FIGS. 6 to 9, the sealing air to be fed to the seal tube 2 is more completely sealed than in the first embodiment so that the sealing effect can be more enhanced.

In the second embodiment, the lower end of the bellows 9 is fixed by the soldering method or the like, but the bellows 9 may be fixed by binding or elastically fastening it.

FIG. 10 is an enlarged sectional view showing the vicinity of the seal ring retaining ring in the first and second embodiments of the invention, and shows a portion of the stator blade at the second stage. The air, as bled from the compressor 150, is cooled by the cooler 154 shown in FIG. 1. The cooling air thus cooled by the cooler 154 is introduced, via the seal tube 2 of the stator blade 31 into the cavity 36, to maintain the cavity at a high pressure as in the prior art while cooling the seal ring retaining ring 37.

Reference letters ΔA1 and ΔA2 designate the thermal elongations in the radial direction of the front and rear stages, as confronting the seal ring mounted on the seal ring retaining ring 37, on the rotor side, and letters AB designate the thermal elongation of the seal ring end face, as held by the seal ring retaining ring 22, on the stationary side. Of these, the thermal elongations ΔA1 and ΔA2 are substantially equal to each other, but the thermal elongation ΔB exhibits characteristics that are different from those of the elongations ΔA1 and ΔA2.

FIG. 11 plots the thermal elongations in the radial direction on the stationary side and the rotor side in a manner to compare the prior art arrangement, in which the seal ring retaining ring 37 is not cooled, and the invention in which the same is cooled. In FIG. 11, ΔB' designates a thermal elongation of the end face of the labyrinth seal 37a (or the seal ring) supported by the seal ring retaining ring 37 and plot the characteristics of the prior art, in which the seal ring retaining ring 37 is not cooled. According to these characteristics, the thermal elongation occurs after the run gradually from the initial clearance S1 and is saturated at a constant level for 4 mm or more at the rated rotation time.

ΔA1 and ΔA2 designate the thermal elongations of the face confronting the seal ring on the rotor side. According to these characteristics, the thermal elongation more abruptly occurs than the elongation ΔB for ten minutes after the run and then increases little by little until it is saturated at a lower level than the elongation ΔB at the rated rotation time. The elongations ΔA1 and ΔA2 exhibit the substantially equal values, and the elongation ΔA1 is located on the front stage side and is slightly larger. However, the elongations ΔA1 and ΔA2 exhibit the substantially identical characteristics.

ΔB designates a thermal elongation of the seal ring end face of the present invention of the case in which the air is cooled by the cooler 154 to cool the seal ring retaining ring 37. The thermal elongation ΔB has an initial value S2, which is larger than the value S1 of the prior art. The characteristics of this thermal elongation ΔB are gentler than those of the elongation AB, and the thermal elongation is saturated at a lower value at the rated rotation time.

The thermal elongation ΔL of a body is generally expressed by $\Delta L = \alpha \cdot L \cdot \Delta T$, wherein: α indicates a coefficient of linear expansion; L indicates the length of the body; and ΔT indicates a temperature difference. Since the thermal elongation ΔL can be reduced according to the formula by reducing the temperature difference ΔT, this difference between the temperature at an assembly (or cold) time and the temperature at a running (hot) time is reduced by cooling the air by the cooler 154 to cool the seal ring holding ring 37 with the air so that the thermal elongation of the seal ring holding ring 37 can be reduced to make ΔB smaller than ΔB'.

Referring to FIG. 11, the thermal elongations ΔA1 and ΔA2 really fluctuate depending upon a vibration at the start or upon an error at the manufacture or assembly. If this error is designated by TL, the thermal elongation ΔB' of the prior art, for which the run has been started with the initial clearance S1, reaches the minimum clearance MCR' before ten minutes and then gradually increases up to thirty minutes, until it is saturated at 4 mm or more when the rated rotating speed is reached. On the other hand, the thermal elongations ΔA1 and ΔA2 on the rotor side increases more steeply at the start but are saturated at lower levels. At the rated rotating time, the difference from the ΔB', i.e., the clearance at the hot time is a relatively large value, as indicated by CR'.

The thermal elongation ΔB of the invention has the initial clearance S2, which is set to be larger than S1 of the prior art. Since the air is cooled by the cooler 154 to cool the seal ring retaining ring 37 thereby making the temperature difference smaller than that of the prior art between the starting (or cold) time and at the running (or hot) time, as described hereinbefore, the thermal elongation ΔB is gentler than the ΔB' so that the minimum clearance MCR occurs after about ten minutes later than in the prior art device. At the rated rotating time, on the other hand, the thermal elongation is saturated at a lower level than that of the prior art so that the difference between the ΔA1 and ΔA2 at the rated rotating time, i.e., the clearance can take the value CR smaller than CR' of the prior art device.

In the first and second embodiments of the present invention, as described hereinbefore, in addition to the aforementioned improvement in the sealing effect, the sealing air supplied to the stator blades at the individual stages is cooled by the cooler 154 and fed to the cavity 36 to cool the seal ring retaining ring 37 so that the temperature difference between the starting time and the running time can be reduced relative to that of the prior art, in which the sealing air is not cooled, to reduce the clearance between the seal portions on the rotor side and the stationary side at the rated rotating time.

In the aforementioned case, moreover, the clearance at the rated running time can be made smaller than that of the prior art even if the initial clearance is enlarged from S1 to S2, so that advantages in the design and manufacture can be achieved to improve the sealing performance.

Figure 12:
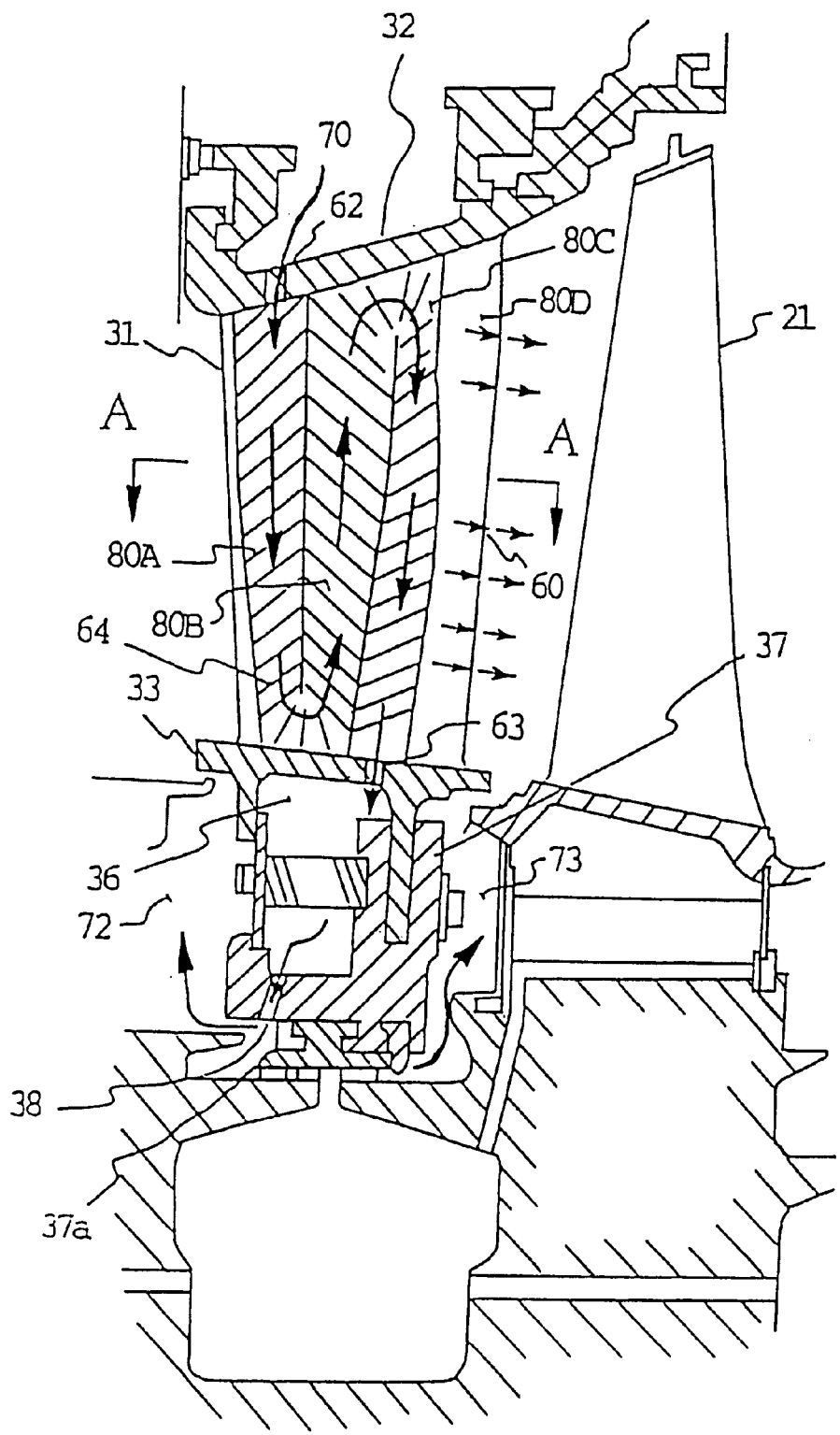
FIG. 12 is a sectional view showing a sealing device for a gas turbine stator blade according to a third embodiment of the invention.
Figure 13:
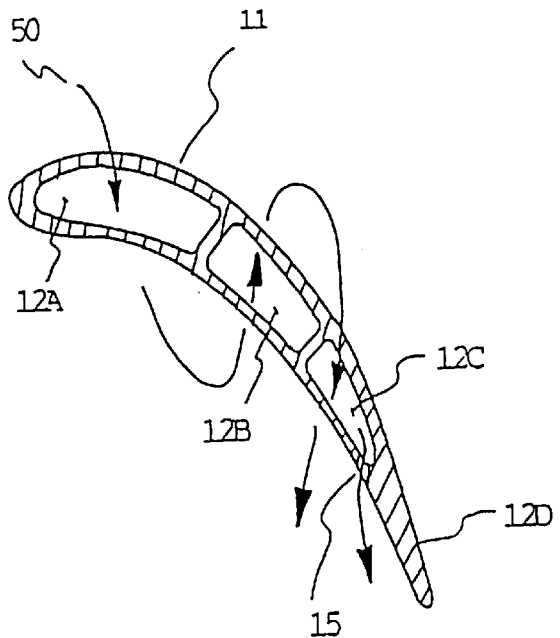
FIG. 13 is a sectional view taken in the direction of arrows A—A of FIG. 12.

FIG. 12 is a sectional view showing a gas turbine stator blade according to a third embodiment of the invention, and FIG. 13 is a sectional view taken along line A—A of FIG. 12. In the stator blade 31, as shown in FIGS. 12 and 13, there are formed air passages 80A, 80B and 80C which sequentially communicate with one another to form a serpentine passage. Reference numeral 80D designates a trailing edge having a number of film cooling air vents 60. Numeral 64 designates a turbulence generator which is exemplified by projecting fins formed on the individual inner walls of the air passages 80A, 80B and 80C to enhance the heat transfer efficiency by making the inflow of the cooling air turbulent.

The cavity 36 is formed in the inner shroud 33. The seal ring retaining ring 37 retains the flange of the inner shroud 33 and the labyrinth seal 37a. The air hole 38, formed in the seal ring retaining ring 37, is in communication with a space 72 between the cavity 36 and the adjoining moving blade.

An air hole 63 is formed in the inner shroud 33 to use the cooling air, as having flown in the air passage 80C to cool the stator blade 31, as the sealing air by guiding the cooling air into the cavity 36. In the outer shroud 32, there is formed a hole 62 for feeding the cooling air. The hole 62 communicates with the air passage 80A on the leading edge side of the stator blade 31. Numerals 72 and 73 designate spaces between the adjoining moving blades 21.

In the moving blade of the third embodiment, the cooling air 70 is fed from the hole 62 of the outer shroud 32 to the air passage 80A on the leading edge side of the stator blade 31 and flows inward into the next air passage 80B and outward into the adjoining next air passage 80C. In the inward flowing route, the cooling air 70 flows out from the trailing edge air hole 60 to cool the trailing edge in a film shape, and the remaining cooling air flows into the cavity 36 from the air hole 63 formed in the inner shroud 33.

Like the cooling air fed from the seal tube 52 in the prior art, the cooling air having flown into the cavity 36 partially flows from the air hole 63 formed in the seal ring retaining ring 37, to the space 72 between the labyrinth seal 37a and the adjoining moving blade and further to the front space 73 via the labyrinth seal 37a.

A portion of the cooling air 70 thus having flown via the air passages 80A, 80B and 80C in the stator blade 31 to cool blade 31 further flows from the air passage 80C via the air hole 63 of the inner shroud 33 into the cavity 36 to maintain the inside of the cavity at a higher pressure than the pressure in the combustion gas passage so that the hot combustion gas will be prevented from entering the inside of the inner shroud.

Figure 16:
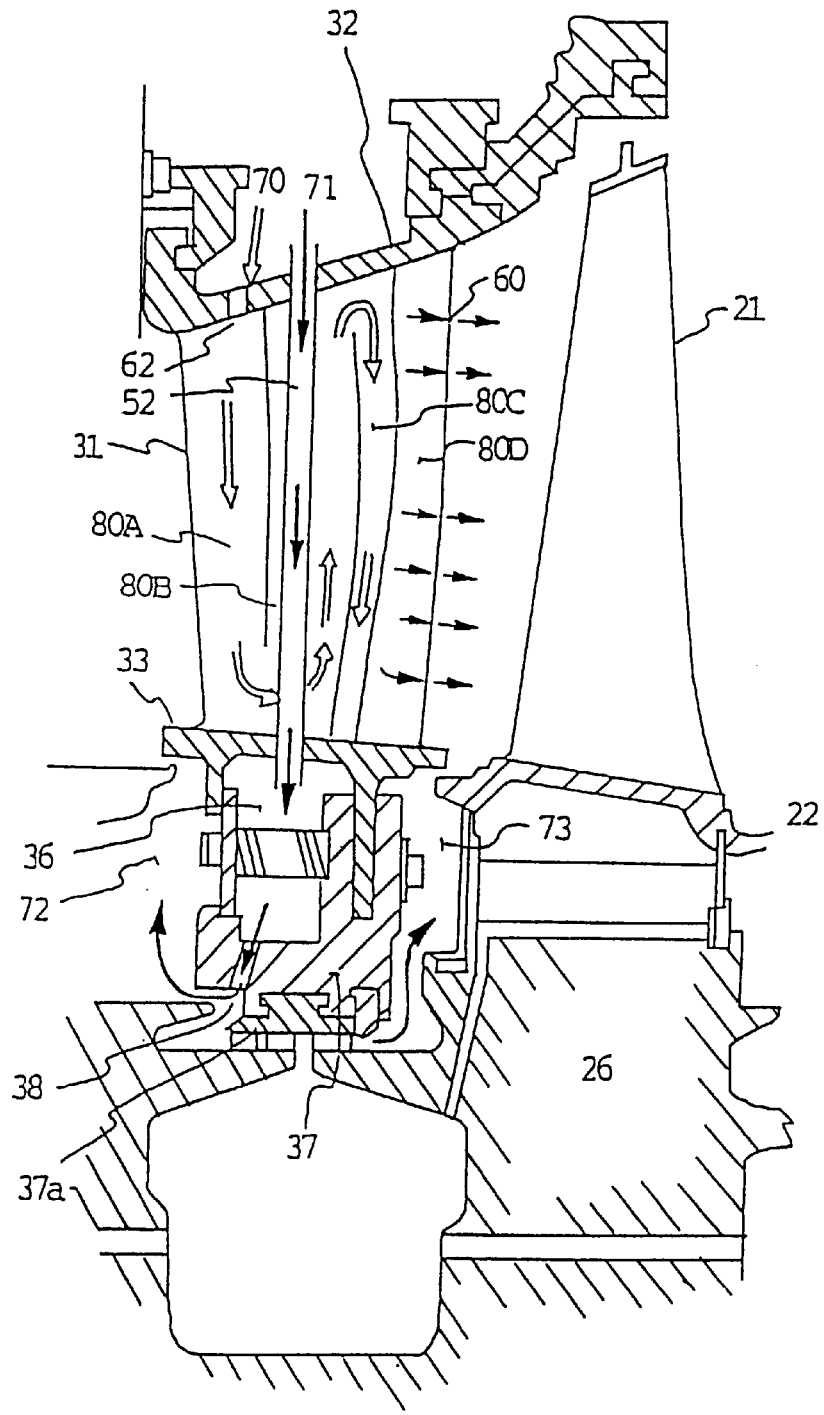
FIG. 16 is a sectional view of the prior art gas turbine stator blade showing flows of sealing air and cooling air.
Figure 17:
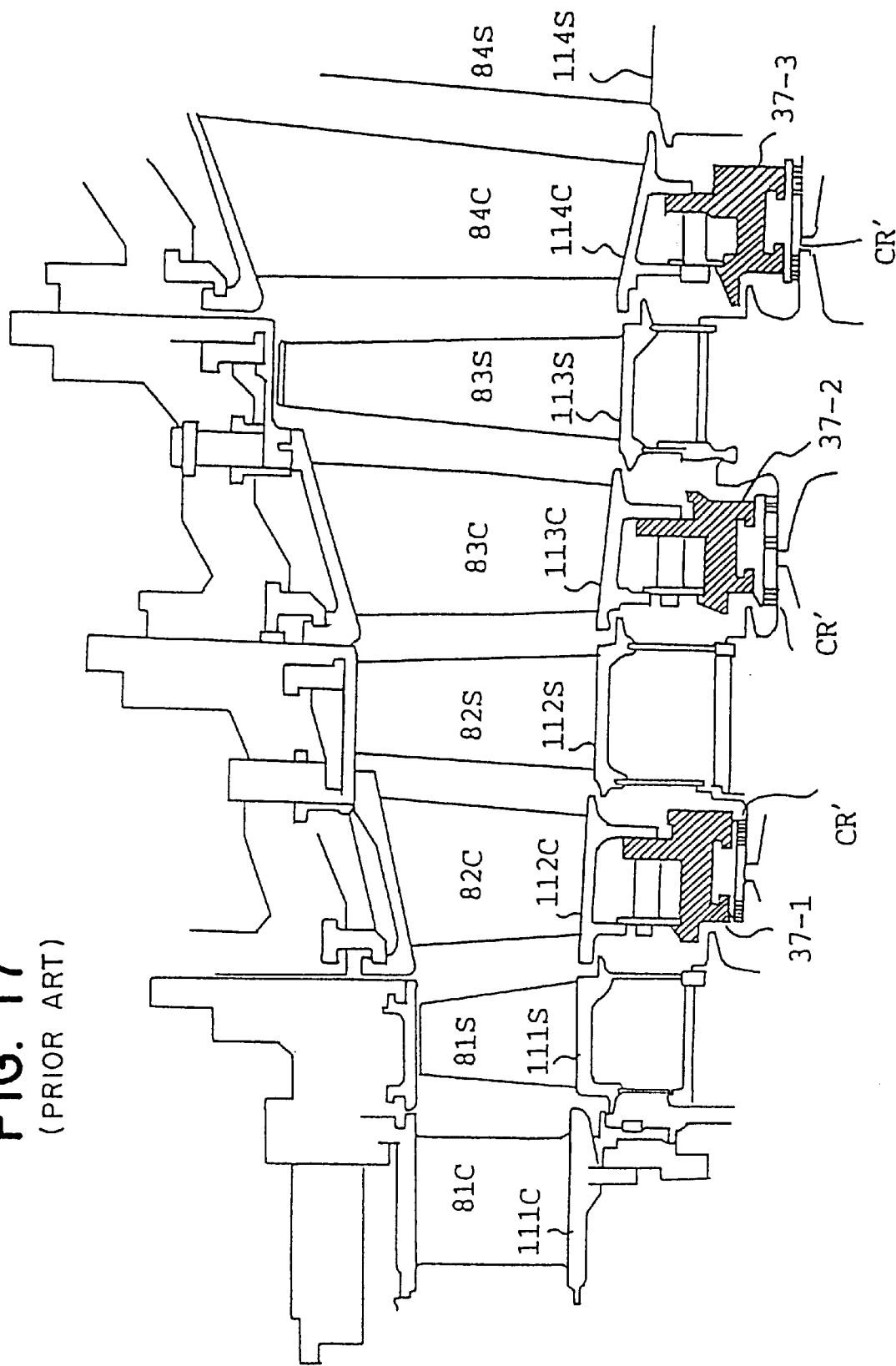
FIG. 17 is a diagram showing a blade array and a seal ring retaining ring of the prior art gas turbine.

The sealing air flowing into the cavity 36 is fed by bleeding a portion of the cooling air from the outer shroud 32 such that the seal tube 52 is formed in the prior art device through the stator blade 31, as shown in FIGS. 15 and 16, whereas the seal tube 2 is formed in the first and second embodiments through the stator blade 31, as shown in FIG. 2. According to the third embodiment of the invention, on the contrary, the cooling air having cooled the stator blade 31 is fed from the air hole 63 of the inner shroud 33 into the cavity 36. Therefore, the seal tube 52 of the prior art device and the seal tube 2 of the first and second embodiments are dispensed with, and the air having cooled the stator blade 31 is used as the sealing air, so that the cooling air can be effectively exploited while reducing its flow rate thereby to make a contribution to an improvement in the performance of the gas turbine.

According to the present invention, the air can be fed without any cavity pressure loss in the inner shroud, so that the pressure in the cavity can be maintained at a higher level than that in the combustion gas passage to enhance the sealing effect. On the other hand, the seal tube is characterized in that it is removably connected to the air hole in the blade ring communicating with the seal tube. With this construction, at the assembly or maintenance time of the stator blade, the leading end of the seal tube can be easily inserted into and fixed in the air hole of the blade ring and can be easily removed.

According to the present invention, the seal tube of the prior art device is dispensed with to reduce costs, and the air having cooled the stator blade is used for the sealing purpose so that the cooling air can be effectively exploited while reducing its flow rate to improve the performance of the gas turbine.

According to the present invention, moreover, the sealing ring retaining ring is cooled to make the thermal elongation smaller on the stationary side than in the prior art device. As a result, the clearance between the stationary side and the rotor side at a rated rotation time can be made smaller than that of the prior art device without the cooling, thereby to improve the sealing performance.

What is claimed is:

1. A sealing device for a gas turbine stator blade, in which air is guided from air holes formed in a blade ring through a space formed by said blade ring, a heat insulating ring and an outer shroud, the air being further guided from said space through a seal tube in the stator blade into an inner shroud, such that a pressure in a cavity of said inner shroud may be maintained at a higher pressure than that in a combustion gas passage to seal the interior of said inner shroud, wherein said air holes include a first air hole communicating with said space, and a second air hole communicating with said seal tube.

2. A sealing device as claimed in claim 1, wherein said seal tube is removably connected to said second air hole.

3. A sealing device as claimed in claim 1, wherein a portion of the air is bled from a compressor into said air holes, said cavity is formed by an inner shroud and a seal ring retaining ring, and the air bled from said compressor is cooled by a cooler prior to being guided into said stator blade to cool said seal ring retaining ring.

4. A sealing arrangement as claimed in claim 1, further comprising a coil spring interposed between a retaining portion of said second air hole and a projection formed on said seal tube.

5. A sealing arrangement as claimed in claim 4, further comprising a coil spring, wherein said seal tube includes a removable adapter partially inserted in said second air hole, said removable adapter having a projection, and said coil spring is interposed between a retaining portion of said second air hole and said projection formed on said removable adapter.

6. A sealing arrangement as claimed in claim 1, further comprising a bellows member connected between said blade ring and said seal tube.

7. A sealing arrangement as claimed in claim 6, further comprising a coil spring disposed between a retaining portion of said second air hole and a radial projection of said seal tube.

8. A stator blade sealing arrangement for a gas turbine, said sealing arrangement comprising:

a stator blade having an outer shroud and an inner shroud;

a blade ring connected to said outer shroud, said blade ring including a first air hole and a second air hole;

heat insulating rings connecting said blade ring with said outer shroud;

a radial space defined by said heat insulating rings, said outer shroud, and said blade ring, wherein said first air hole communicates with said radial space;

a seal tube extending from said second air hole, through said radial space and said stator blade and into said inner shroud, said seal tube having a first end communicating with said second air hole, wherein air bled from a compressor can be guided into said radial space, via said first air hole, and into an interior of said inner shroud through said seal tube, via said second air hole, so that pressure in a cavity of said inner shroud can be maintained at a higher pressure than a pressure in a combustion gas passage.

9. A sealing device arrangement as claimed in claim 8, wherein the air bled from the compressor passes through a cooler prior to entering said first and second air holes.

10. A sealing arrangement as claimed in claim 8, further comprising a coil spring interposed between a retaining portion of said second air hole and a projection formed on said seal tube.

11. A sealing arrangement as claimed in claim 8, further comprising a coil spring, wherein said seal tube includes a removable adapter partially inserted in said second air hole, said removable adapter having a projection, and said coil spring is interposed between a retaining portion of said second air hole and said projection formed on said removable adapter.

12. A sealing arrangement as claimed in claim 8, further comprising a bellows member connected between said blade ring and said seal tube.

13. A sealing arrangement as claimed in claim 12, further comprising a coil spring disposed between a retaining portion of said second air hole and a radial projection of said seal tube.

* * * * *

UNITED STATES PATENT AND TRADEMARK OFFICE
CERTIFICATE OF CORRECTION

PATENT NO. : 6,217,279 B1  
DATED : April 17, 2001  
INVENTOR(S) : Toshishige Al et al.

It is certified that error appears in the above-identified patent and that said Letters Patent is hereby corrected as shown below:

<u>Title page,</u>  
Item [30], "Foreign Application Priority Data", please change the second Foreign Application Priority Data as follows:  
change "Jul. 7, 1997 (JP)......9-275734" to -- Jul. 7, 1997 (JP) .........9-175734 --.

Signed and Sealed this

Eighteenth Day of December, 2001

*Attest:*

*Attesting Officer*

JAMES E. ROGAN  
*Director of the United States Patent and Trademark Office*